(12) United States Patent
Greenberger et al.

(10) Patent No.: US 11,068,953 B2
(45) Date of Patent: Jul. 20, 2021

(54) FINGERPRINT BASED ADDRESS ENTRY

(71) Applicant: International Business Machines Corporation, Armonk, NY (US)

(72) Inventors: Jeremy A. Greenberger, San Jose, CA (US); Lisa Seacat DeLuca, Baltimore, MD (US); Jeremy R. Fox, Georgetown, TX (US); Kelley Anders, East New Market, MD (US)

(73) Assignee: International Business Machines Corporation, Armonk, NY (US)

( * ) Notice: Subject to any disclaimer, the term of this patent is extended or adjusted under 35 U.S.C. 154(b) by 105 days.

(21) Appl. No.: 15/986,852

(22) Filed: May 23, 2018

(65) Prior Publication Data
US 2019/0362398 A1 Nov. 28, 2019

(51) Int. Cl.
*G06Q 30/06* (2012.01)
*G06K 9/00* (2006.01)
*G06F 3/0481* (2013.01)
*G06F 3/0488* (2013.01)
*G06F 3/0484* (2013.01)

(52) U.S. Cl.
CPC ..... *G06Q 30/0609* (2013.01); *G06F 3/04817* (2013.01); *G06F 3/04883* (2013.01); *G06K 9/00013* (2013.01); *G06K 9/00087* (2013.01); *G06F 3/04842* (2013.01)

(58) Field of Classification Search
None
See application file for complete search history.

(56) References Cited

U.S. PATENT DOCUMENTS 6,944,773 B1 * 9/2005 Abrahams ............. H04L 9/3231
713/168
7,885,899 B1 2/2011 Sancho
(Continued)

FOREIGN PATENT DOCUMENTS

| CN | 103020140 B | 1/2016 |
| CN | 103582119 B | 12/2016 |
| WO | 2017111483 A1 | 6/2017 |

OTHER PUBLICATIONS

Patent Cooperation Treaty, PCT, Notification of Transmittal of the International Search Report and the Written Opinion of the International Searching Authority, or the Declaration, International application No. PCT/IB2019/053022, International Filing date: Apr. 12, 2019, 10 pages.
(Continued)

*Primary Examiner* — Kevin Ky
(74) *Attorney, Agent, or Firm* — Erik C. Swanson

(57) ABSTRACT

Embodiments of the present invention provides methods, computer program products, and a system for providing a shipping and billing address for online product purchases based on a fingerprint of a user. Embodiments of the present invention can be used to request a live scan of a fingerprint, identify a stored address based on the fingerprint, and complete a shipping and billing address section for an online purchase using the stored address. Embodiments of the present invention can be used to collect a fingerprint from a user, match the fingerprint to a database of fingerprints, and acquire a stored address mapped to the fingerprint. Embodiments of the present invention can be used quickly provide a shipping and billing address for an online purchase based on a double-tap gesture made by a user on an electronic device.

17 Claims, 9 Drawing Sheets

(56) References Cited

U.S. PATENT DOCUMENTS

| | | |
|---|---|---|
| 8,712,857 B1 | 4/2014 | Adornato et al. |
| 9,741,026 B1 | 8/2017 | Grassadonia et al. |
| 2007/0198435 A1 | 8/2007 | Siegal et al. |
| 2015/0074615 A1* | 3/2015 | Han .................. H04W 12/06 715/863 |
| 2015/0163817 A1 | 6/2015 | Brunel et al. |
| 2017/0262798 A1 | 9/2017 | Kosseifi et al. |

OTHER PUBLICATIONS

Frost et al., "Cloud-based Identity and Authentication: Biometrics-As-A-Service", A White Paper by Frost & Sullivan in collaboration with Fujitsu, Copyright © 2016 Frost & Sullivan, 18 pages.

Disclosed Anonymously et al., "A method of finding "alternative, trusted and viable shipping recipients" as identified by contextual Iot devices for increased ROI for both seller and buyer", IP.com No. IPCOM000251687D, IP.com Electronic Publication Date: Nov. 24, 2017, 4 pages.

IBM et al. "Determining Trusted Individuals for Groupings of Item Shipment through Utilization of Social Networks and Location Data", An IP.com Prior Art Database Technical Disclosure, Original Publication Date: Dec. 21, 2009, IP.com No. IPCOM000191211D, 3 pages.

Linux Defenders et al. "Centralized E-Commerce System", An IP.com Prior Art Database Technical Disclosure, Original Publication Date: Jul. 29, 2009, IP.com No. IPCOM000185645D, 7 pages.

"Device Fingerprinting for Low Friction Authentication", White Paper, NetIQ, © 2017 NetIQ Corporation and its affiliates, 10 pages.

\* cited by examiner

FINGERPRINT BASED ADDRESS ENTRY

BACKGROUND

The present invention relates generally to the field of commerce, and more particularly to E-commerce.

Since the advent of consumer internet, online shopping has continued to evolve to bring greater ease for the average consumer. User experience within mobile devices and shopping optimization is critical, and creative innovations bring in new customers to a seller's digital space. Typical retailer websites for consumer shopping include a digital shopping cart that a consumer can digitally place items in a queue for later purchase. Once the consumer is ready to confirm the purchase, the consumer enters a form of payment (e.g., credit or debit card number), a billing address, and a shipping address. In some situations, if the consumer is a returning customer on the retailer website, the computer device used to access the retailer website by the consumer can save a cookie on the computer device, which stores billing and/or shipping address of the consumer so that the computer device can recall the cookie and thus auto-populate address fields for the consumer. In other situations, the retailer website can have a database of customer accounts that stores billing and shipping address information for each customer account, as well as storing custom shipping and billing address information for unique locations (i.e., the consumer purchases an item under an account of the consumer, but has a stored shipping address on the retailer website for shipping gifts to a relative of the consumer).

SUMMARY

Embodiments of the present invention disclose a method, a computer program product, and a system for providing a shipping and billing address for online product purchases based on a fingerprint of a user. In one embodiment of the present invention, a method is provided comprising: responsive to a determination that a user initiated a purchase, requesting a live scan of a fingerprint; identifying a stored address based on the fingerprint; and, responsive to a confirmation from the user, filling out an inputtable text field with the identified stored address.

DETAILED DESCRIPTION

Figure 1:
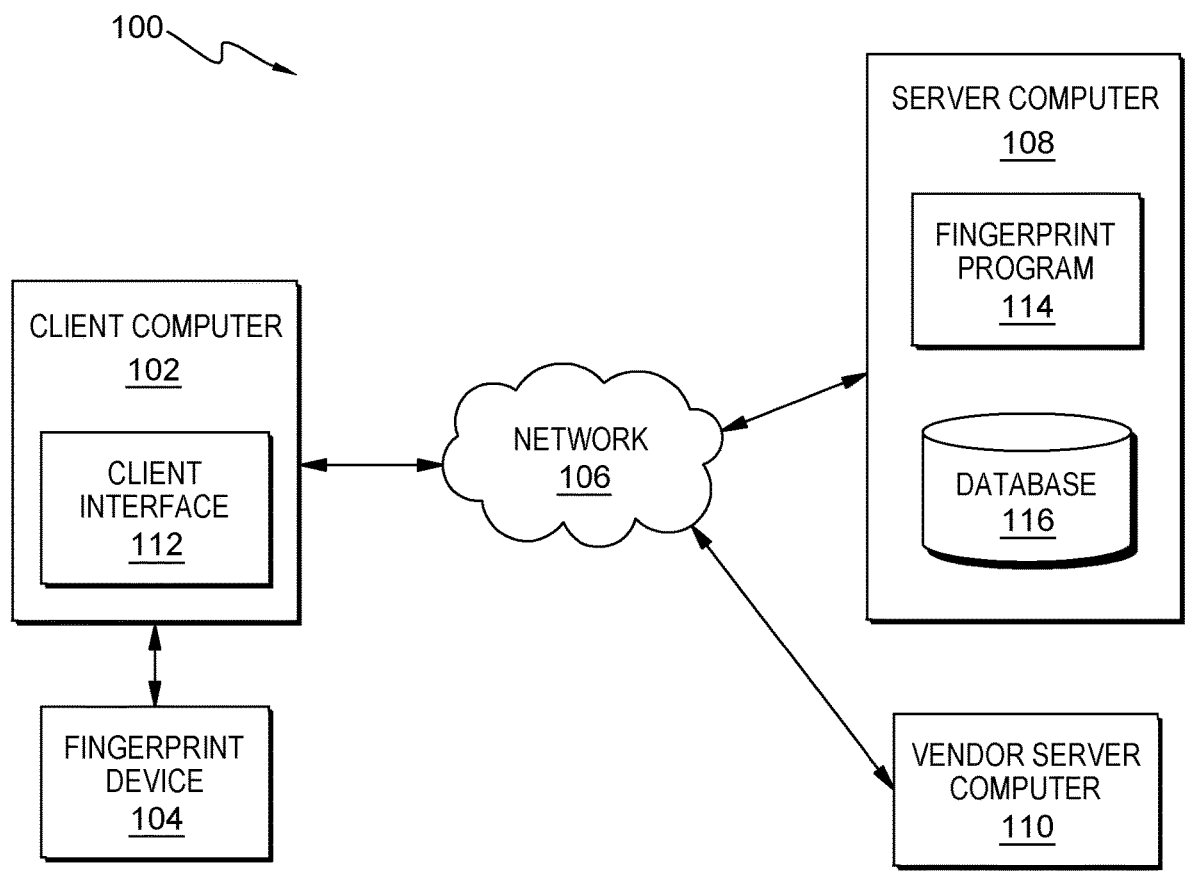
FIG. 1 is a functional block diagram illustrating a fingerprint collection environment, in accordance with an embodiment of the present invention.

Embodiments of the present invention recognize that providing, or even switching between, shipping and billing addresses when purchasing products on a retailer website can be tedious for a consumer. For example, in some cases, the consumer may have multiple cookies for multiple addresses, thus forcing the consumer to carefully parse through the various cookies to find the correct address for billing and for shipping. Sometimes, these cookies only provide piecemeal information where one cookie provides information for a street address, but another cookie provides state and zip code information. In another example, a consumer may have an account with a first retailer website that stores multiple addresses for the consumer, but when the consumer makes a purchase on a second retailer website visited by the consumer for a first time, the consumer must take time to enter shipping and billing information again. This amount of time spent on entering address fields can compound, much to the annoyance of the consumer, if the consumer must visit multiple retailer websites to purchase various products.

Embodiments of the present invention provide a technical improvement for streamlining the shipping and billing address acquisition step for online product purchases. Fingerprints are generally known as a unique identifier for a user that is used as a tool for authentication or identification of the user, such as pairing fingerprints with purchasing credentials as a security identifier that confirms the identity of the user making the purchase; however, it should be noted that the embodiments of the present invention focus on mapping a set of fingerprints to a corresponding set of addresses for quick provision of a shipping or billing address to a retailer. As described in greater detail later in this specification, embodiments of the present invention provide the capability of fast access to stored addresses for a user based on the fingerprints of the user, where each fingerprint of the user is mapped to information of a particular address, regardless of which retailer website the user makes a purchase. Embodiments of the present invention provide the capability of generating and providing a user interface for a user for adding, editing, and managing a set of addresses associated with a corresponding set of fingerprints. Embodiments of the present invention provide for a user the capability of fast access to stored addresses based on the fingerprints of the user as an internet browser extension and/or browser plugin. Embodiments of the present invention streamlines the customer experience while shopping on a retailer website by reducing the amount of time spent having to complete digital address forms, and by reducing user error in completing digital address forms, thus increasing the chance the customer will shop again using this method. Implementation of embodiments of the invention may take a variety of forms, and exemplary implementation details are discussed subsequently with reference to the Figures.

FIG. 1 is a functional block diagram illustrating a fingerprint collection environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Fingerprint collection environment 100 includes client computer 102, fingerprint device 104, server computer 108, and vendor server computer 110, all interconnected over network 106. Client computer 102, server computer 108, and vendor server computer 110 can each be a standalone computing device, a management server, a webserver, a mobile computing device, or any other electronic device or computing system capable of receiving, sending, and processing data. In other embodiments, client computer 102, server computer 108, and vendor server computer 110 can each represent a server computing system utilizing multiple computers as a server system, such as in a cloud computing environment. In another embodiment, client computer 102, server computer 108, and vendor server computer 110 can each be a laptop computer, a tablet computer, a netbook computer, a personal computer (PC), a desktop computer, a personal digital assistant (PDA), a smart phone, or any programmable electronic device capable of communicating with various components and other computing devices (not shown) within fingerprint collection environment 100 via network 106. In another embodiment, client computer 102 and server computer 108 each represent a computing system utilizing clustered computers and components (e.g., database server computers, application server computers, etc.) that act as a single pool of seamless resources when accessed within fingerprint collection environment 100. In some embodiments, client computer 102 and server computer 108 are a single device. Client computer 102, server computer 108, vendor server computer 110 may include internal and external hardware components capable of executing machine-readable program instructions, as depicted and described in further detail with respect to FIG. 5.

As used herein, client computer 102 is a computing system associated with a user that is providing an address to a vendor. As used herein, vendor server computer 110 is a computing system associated with a vendor that is requesting an address from a user in order to complete a transaction. In some embodiments, a vendor is any person or business entity offering goods or services for sale at a remote physical location. For example, a vendor can be an online shopping website. In another embodiment, a vendor is any person or company offering goods or services for sale using a mobile location. For example, a vendor can be a transportation service that requires address to pick-up/drop-off a user (e.g., a taxi service). In another embodiment, a vendor is an emergency service. For example, a vendor can be ambulance requesting an address from a user to perform an emergency service for the user.

Server computer 108 includes fingerprint program 114 and database 116. In general, fingerprint program 114 is a program capable of collecting a set of fingerprints and a set of addresses of a user, mapping the set of fingerprints to the set of addresses respectively, and storing the mapped set of fingerprints and corresponding set of addresses to database 116. Fingerprint program 114 can collect a scan of a fingerprint associated with a user, and provide for a retailer a shipping and a billing address of the user based on the collected fingerprint. For example, a user initiates a purchase on a retailer website, and the user is prompted to fill in an inputtable text field with a shipping and a billing address of the user. As used herein, "e-commerce website" and "retailer website" can be used interchangeably. Fingerprint program 114 collects a fingerprint of the user, identifies a stored address based on the collected fingerprint, and fills out the inputtable text field with the identified stored address. Furthermore, fingerprint program 114 is a program capable of generating a user interface that allows a user to interact with fingerprint program 114 in collecting a set of fingerprints and a set of addresses for mapping and storing the set of fingerprints with the corresponding set of addresses on database 116, and is also capable of generating a user interface that allows a user to add, edit, and manage the set of fingerprints and the corresponding set of addresses collectively stored on database 116. In some embodiments, fingerprint program 114 can be implemented with an internet browser as an extension and/or as a plugin for the internet browser.

In one embodiment, in response to receiving a fingerprint, fingerprint program 114 is a program capable of simultaneously providing user identification credentials to a retailer website, purchasing credentials of a user to a retailer website, and a shipping address to a retailer website. As used herein, identification credentials can be a login user name and a corresponding password to access an account of the user for the retailer website. Identification credentials can be stored on database 116 and likewise mapped to a fingerprint of the user. As used herein, financial credentials can include, but is not limited to, a credit card number or a debit card number, a card verification value (CVV) number, and an expiration date. Financial credentials can be stored on database 116 and likewise mapped to a fingerprint of the user. For example, a user prepares a purchase order by proceeding to checkout upon adding a set of selected items to an online shopping cart. The user can instruct fingerprint program 114 to execute by selecting an interactive graphical icon that, upon selecting, prompts fingerprint program 114 to request a live scan of a fingerprint of the user. Fingerprint program 114 receives a fingerprint from the user from fingerprint device 104, identifies a stored addressed based on the fingerprint of the user, and fills out an inputtable text field that requests a shipping address by inputting the identified stored address. Simultaneously, fingerprint program 114 also identifies identification credentials of the user for the retailer website based on the fingerprint of the user, and provides the identified identification credentials to the retailer website, subsequently logging the user onto an account of the user on the retailer website (i.e., fingerprint program 114 logs the user onto an account of the user by providing for a retailer website an identified login user name and corresponding password based on the fingerprint of the user). Also simultaneously, fingerprint program 114 identifies financial credentials of the user for the retailer website based on the fingerprint of the user, and provides the identified financial credentials to the retailer website, subsequently allowing the retailer website to accept the purchase order based on the provided financial credentials of the user.

In a further embodiment, fingerprint program 114 is a program capable of simultaneously providing user identification credentials to a retailer website, purchasing credentials of a user to a retailer website, and a shipping address to a retailer website at a different phase of shopping, wherein a phase of shopping can be, but is not limited to, before shopping/browsing for items for purchase (i.e., no items added to a online shopping cart), during shopping/browsing for items for purchase (i.e., at least a single item has been added to the online shopping cart, but the user continues browsing for additional items for purchase), and at checkout (i.e., the user has completed browsing and is ready to submit a purchase order). For example, prior to a user logging into a shopping account for a retailer website and adding an item selection to an online shopping cart, the user can execute fingerprint program 114 to receive a fingerprint of the user. Upon receiving the fingerprint of the user, fingerprint program 114 can identify and provide for the retailer website identification credentials of the user, purchasing credentials of the user, and a shipping address of the user. Once fingerprint program 114 provides the identified identification credentials, purchasing credentials, and shipping address of the user to the retailer website, the user can add items for purchase in the online shopping cart and immediately submit the purchase order to the retailer website based on the provided identification credentials, purchasing credentials, shipping address, and added items for purchase. Fingerprint program 114 is depicted and described in further detail with respect to FIG. 2.

In a further embodiment, fingerprint program 114 is a program capable of detecting when an item has been added to an online shopping cart. In response to a user adding an item to an online shopping cart, fingerprint program 114 requests a scan of a finger of the user to be used for that particular item. Upon reception of the fingerprint of the user, fingerprint program 114 uses purchase information associated with the fingerprint to complete the order for that particular item. For example, a user placed two items, a first item and a second item, into their shopping cart. Fingerprint program 114 provides each item in the cart with a fingerprint icon associated with each respective item. Upon determining selection of a first icon associated with the first item, fingerprint program 114 requests a fingerprint for that item. In this example, the user uses their index finger for the fingerprint. As such, a first payment source and a first shipping address associated with that fingerprint of the index finger are used for the first item. Upon determining selection of a second icon associated with the second item, fingerprint program 114 requests a fingerprint for that item. In this example, the user uses their middle finger for the fingerprint. As such, a second payment source and a second shipping address associated with that fingerprint of the middle finger are used for the first item. As such, in the one purchase, different shipping addresses and payment methods are applied to the items included in the shopping cart.

In another embodiment, fingerprint program 114 can provide an identified address as a shipping and/or billing address by providing a stored set of reference values associated with the fingerprint of the user to vendor server computer 110 through an API (application programming interface) call, wherein the stored set of reference values corresponds to, but is not limited to, user identification and an address. In response to receiving the reference value in the API call, vendor server computer 110 can query database 116 to acquire the stored address based on the reference value. For example, a user adds an item to an online shopping cart for purchase, and selects an interactive graphical icon that executes fingerprint program 114 to request a fingerprint scan from the user. Fingerprint program 114 identifies a set of stored reference values on database 116 based on the fingerprint (i.e., in response to receiving a fingerprint from a user, fingerprint program 114 identifies the user as "user=5", and identifies the address as "address=2", both based on the received fingerprint from the user). In one embodiment, fingerprint program 114 transmits the stored set of reference values to vendor server computer 110 by an API Uniform Resource Locator (URL) call reproduced below:

API URL Example Call 1
https://myfavretailer.com/api/purchase?user=5&address=2&cart=7
which instructs vendor server computer 110 that the items in the online shopping cart associated with the user (i.e., cart=7) are associated with "user=5" (i.e., the user) and is to be shipped to and/or billed to address "address=2". Vendor server computer 110 can then query database 116 to obtain a set of text strings associated with the set of reference values (i.e., vendor server computer 110 identifies that "user=5" is associated with "Joe Schmo", and identifies that "address=2" is associated with address "123 Generic Street, Some City, TX, 77444").

In an even further embodiment, vendor server computer 110 can display on a display screen (i.e., client interface 112) that the items in the online shopping cart associated with the user is being purchased by the identified user, and is to be shipped to and/or billed to the identified address (i.e., vendor server computer 110 displays for a user on a purchasing interface window that the items being purchased are purchased by "Joe Schmo" and is to be shipped to and/or billed to "123 Generic Street, Some City, TX, 77444").

Database 116 is a repository for data accessible by fingerprint program 114. Database 116 can be implemented with any type of storage device capable of storing data and configuration files that can be accessed and utilized by server computer 108, such as a database server, a hard disk drive, or a flash memory. Database 116 stores profile data corresponding to a user, wherein the profile data corresponding to the user includes, at least in part, a set of fingerprint signals that describe a corresponding set of fingerprints associated with a user, a set of addresses associated with a user, and fingerprint-address data, wherein the fingerprint-address data describes the mapping between a fingerprint signal and an address of a user. As used herein, a fingerprint signal is a digital signal that describes a fingerprint associated with a finger of a user. For example, database 116 stores profile data containing at least a fingerprint signal of a user, an address of a user, and a fingerprint-address data that, when fingerprint program 114 identifies a user based on the fingerprint of the user, fingerprint program 114 can retrieve the stored address of the user based on the mapped fingerprint-address data. As used herein, an address of a user describes a location or destination that can either be a physical location (e.g., a home address for receiving physical postage) or a digital location (e.g., an email address or internet protocol (IP) address).

Client computer 102 includes client interface 112, wherein client interface 112 allows a user to interact with client computer 102, fingerprint device 104, and server computer 108 (subsequently fingerprint program 114). In general, client interface 112 can be implemented using a browser, web portal, or any program that transmits queries to, and receives results from, server computer 108. Furthermore, client computer 102 is connected to fingerprint device 104, wherein fingerprint device 104 is a device that can collect fingerprint scans of a user.

Network 106 can be, for example, a telecommunications network, a local area network (LAN), a wide area network (WAN), such as the Internet, or a combination of the three, and can include wired, wireless, or fiber optic connections. Network 106 can include one or more wired and/or wireless networks that are capable of receiving and transmitting data, voice, and/or video signals, including multimedia signals that include voice, data, and video information. In general, network 106 can be any combination of connections and protocols that will support communications among client computer 102, server computer 108, and other computing devices (not shown) within fingerprint collection environment 100.

For illustrative purposes, the following discussion is made with respect to fingerprint program 114 hosted on server computer 108, where a user interacts with fingerprint program 114 via user interface 112 and fingerprint device 104 as part of client computer 102. However, it should be understood that client computer 102 and server computer 108 can be on a single device, a combination of devices, and/or on one or more other components of fingerprint collection environment 100.

Figure 2:
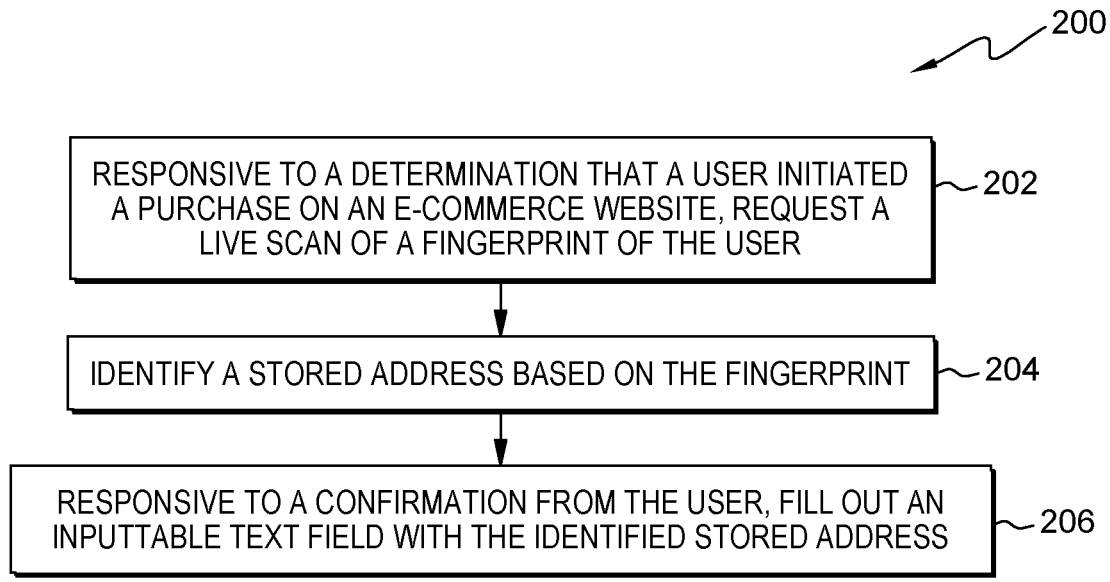
FIG. 2 is a flowchart depicting operational steps of a fingerprint program for providing an address associated with a fingerprint of a user, in accordance with an embodiment of the present invention.

FIG. 2 is a flowchart 200 depicting operational steps of a fingerprint program for providing an address associated with a fingerprint of a user, in accordance with an embodiment of the present invention.

In step 202, responsive to a determination that a user initiated a purchase on an e-commerce website, fingerprint program 114 requests a live scan of a fingerprint of the user. In this embodiment, fingerprint program 114 determines a user initiated a purchase by receiving a prompt from a user on client interface 112 instructing fingerprint program 114 to request a live scan of a fingerprint of the user for identifying a stored address. For example, while browsing a retailer website, a user proceeds to checkout after having selected a set of products for purchase. The user uses client interface 112 to prompt fingerprint program 114 to execute. In this example, fingerprint program 114 determines a user initiated a purchase by receiving a prompt from the user, and in response to the determination, requests a live scan of a fingerprint of the user.

Responsive to a determination that a user initiated a purchase of a product on an e-commerce website, fingerprint program 114 requests a live scan of a fingerprint of the user. In this embodiment, fingerprint program 114 requests a live scan of a fingerprint of the user by activating fingerprint device 104 such that fingerprint device 104 is ready to detect a fingerprint, and by transmitting a set of instructions to client computer 102 to display a text request on client interface 112 that informs the user to place a finger into or onto fingerprint device 104 for a live scan of the fingerprint corresponding to the finger of the user. For example, upon determining that a user initiated a purchase of a product on a retailer website, fingerprint program 114 activates fingerprint device 104 to readily receive a fingerprint from the user, and instructs client computer 102 to display a window on client interface 112 displaying the text string "Please place finger on fingerprint device 104 for address retrieval". In another embodiment, fingerprint program 114 requests a live scan of a fingerprint of the user by transmitting a set of instructions to client computer 102 to provide a haptic feedback response that signals to a user to place a finger of the user into or onto fingerprint device 104 for a live scan of the fingerprint corresponding to the finger of the user, wherein the haptic feedback response can be a buzz or vibration. For example, upon determining that a user initiated a purchase of a product on a retailer website on a mobile phone, which contains elements of client computer 102, fingerprint device 104, and server computer 108 in a single device, fingerprint program 114 activates fingerprint device 104 on the mobile phone to readily receive a fingerprint, and instructs the mobile phone vibrate periodically, thus signaling to the user that fingerprint device 104 is ready for a live scan of a fingerprint of the user.

In another embodiment, fingerprint program 114 determines a user initiated a purchase by continuously monitoring text strings displayed on client interface 112. In this embodiment, where an e-commerce website is used as the vehicle for purchases, fingerprint program 114 monitors browser activity of the user for one or more terms that indicate a purchase is being made. For example, a user selects a set of products for purchase on a retailer website, and then proceeds to a checkout interface. Fingerprint program 114 can identify that the interface has the following characters that indicate a purchase (e.g., has a text string "Address:", "Shipping Address", or "Ship-to Address" followed by an inputtable text field where the user is to enter an address describing a location the user is requesting to ship the set of products selected on the retailer website. In this example, fingerprint program 114 determines a user initiated a purchase by detecting the text string and inputtable text field, and in response to the determination, requests a live scan of a fingerprint of the user.

In another embodiment, fingerprint program 114 determines a user initiated a purchase using client computer 102 by continuously monitoring for an indication of a checkout made by a user, wherein the indication of a checkout can be a user selection of an icon (e.g., a shopping cart icon, a home icon that symbolizes billing and shipping information for the purchase, or a checkmark) that signals to client computer 102 to obtain a checkout window interface from vendor server computer 110 and display on client interface 112 the checkout window interface that requests a shipping address and/or a billing address.

In yet another embodiment, fingerprint program 114 determines a user initiated a purchase using client computer 102 by receiving a confirmation signal from client interface 112 that a user confirms that a set of financial credentials provided by the user are correct, wherein the financial credentials include, but is not limited to, a credit card number or a debit card number, a card verification value (CVV) number, and an expiration date. For example, a user selects a set of products for purchase on a retailer website using client interface 112, and then proceeds to a checkout interactive window displayed on client interface 112. The user provides a set of financial credentials of the user by entering on client interface 112 a credit card number, a CVV number associated with the credit card number, and an expiration date associated with the credit card number. In this example, fingerprint program 114 determines a user initiated a purchase by receiving a confirmation signal from client interface 112 that the user confirms that the financial credentials are correct, and in response to the determination, requests a live scan of a fingerprint of the user.

In step 204, fingerprint program 114 identifies a stored address based on the fingerprint. In this embodiment, fingerprint program 114 identifies a stored address based on the fingerprint of the user by collecting a fingerprint signal from fingerprint device 104, matching the collected fingerprint signal to a database of signals that correspond to a set of fingerprints of the user, and acquiring a stored address based on the matched fingerprint signal as described in greater detail with regard to FIG. 3, flowchart 300.

In step 206, responsive to a confirmation from the user, fingerprint program 114 fills out an inputtable text field with the identified stored address. In this embodiment, fingerprint program 114 receives confirmation to utilize the identified address by receiving a confirmation selection from the user via client interface 112. For example, fingerprint program 114 identifies the address: "3003 Location Ave., San Jose, Calif. 95128" based on a fingerprint associated with a user. Upon identifying the address, fingerprint program 114 generates a window prompt to the user on client interface 112 requesting "Use address '3003 Location Ave., San Jose, Calif. 95128' as the shipping address? Tap screen to confirm, or press and hold to cancel". The user taps the screen, and fingerprint program 114 receives a signal from client interface 112, thus confirming to utilize the added address as the shipping address. Fingerprint program 114 then proceeds in filling out an inputtable text field with the identified stored address. Thus, upon determining that a user initiated a purchase on a retailer website, fingerprint program 114 can acquire a fingerprint signal corresponding to a fingerprint of a user, identify a stored address based on the fingerprint, and fill in inputtable text fields requesting a shipping address and/or billing address using the stored address, effectively minimizing the time and effort required by the user for executing a purchase on the retailer website.

In a further embodiment, after a user confirms a first address to be used for a shipping address, a user can select a second address to be used as a billing address; or vice versa, after a user confirms a first address to be used for a billing address, a user can select a second address to be used as a shipping address. In this embodiment, in response to receiving a confirmation to utilize a first identified address associated with a first fingerprint of the user as the shipping address, fingerprint program 114 can repeat step 204 in identifying a second stored address based on a second fingerprint of the user for acquiring a billing address associated with the user. For example, fingerprint program 114 receives a confirmation that a first address is to be used as the shipping address, wherein the first address is associated with a first fingerprint. Fingerprint program 114 then requests a live scan of a fingerprint of the user for acquiring an address for billing information. The user scans a second fingerprint using fingerprint device 104. Fingerprint program 114 receives a second fingerprint signal associated with the second fingerprint from fingerprint device 104, and identifies a second stored address based on the second fingerprint signal. Fingerprint program 114 then prompts the user to confirm the second address as the billing address. The user taps the screen, and fingerprint program 114 receives a signal from client interface 112, thus confirming the use of the second address as the billing address. Fingerprint program 114 then proceeds in filling out corresponding inputtable text fields with the first and second identified addresses.

In an even further embodiment, after a first user confirms a first address to be used for a shipping address, a second user can select a second address to be used as a billing address; or vice versa, after a first user confirms a first address to be used for a billing address, a second user can select a second address to be used as a shipping address. In this embodiment, in response to receiving a confirmation to utilize a first identified address associated with a first fingerprint of a first user as the shipping address, fingerprint program 114 can repeat step 204 in identifying a second stored address based on a fingerprint of a second user for acquiring a billing address associated with the user. For example, fingerprint program 114 receives a confirmation that a first address is to be used as the shipping address, wherein the first address is associated with a first fingerprint of a first user. Fingerprint program 114 then requests a live scan of a fingerprint of the user for acquiring an address for billing information. A second user scans a second fingerprint using fingerprint device 104. Fingerprint program 114 receives a second fingerprint signal associated with the second fingerprint from fingerprint device 104, and identifies a second stored address based on the second fingerprint signal. Fingerprint program 114 then prompts the second user to confirm the second address as the billing address. The second user taps the screen, and fingerprint program 114 receives a signal from client interface 112, thus confirming the use of the second address as the billing address. Fingerprint program 114 then proceeds in filling out corresponding inputtable text fields with the first and second identified addresses.

In another embodiment, after a user confirms a first address to be used for a first shipping address, a user can select a second address to be used as a second shipping address. In this embodiment, in response to receiving a confirmation to utilize the identified address associated with a first fingerprint of the user as a first shipping address, fingerprint program 114 can repeat step 204 in identifying a second stored address based on a second fingerprint of the user for acquiring a second shipping address associated with the user. For example, a user wishes to a first and a second item on a retailer website, but would like to ship the first item to a first shipping address and ship the second item to a second shipping address. The user scans a first fingerprint using fingerprint device 104 and fingerprint program 114 identifies a first stored address based on the first fingerprint. Fingerprint program 114 receives a confirmation that a first address is to be used as the first shipping address for the first item, wherein the first address is associated with a first fingerprint. Fingerprint program 114 then requests a live scan of a fingerprint of the user for acquiring a second shipping address for the second item. The user scans a second fingerprint using fingerprint device 104. Fingerprint program 114 receives a second fingerprint signal associated with the second fingerprint from fingerprint device 104, and identifies a second stored address based on the second fingerprint signal. Fingerprint program 114 then prompts the user to confirm the second address as the second shipping address. The user taps the screen, and fingerprint program 114 receives a signal from client interface 112, thus confirming the use of the second address as the second shipping address. Fingerprint program 114 then proceeds in filling out corresponding inputtable text fields with the first and second identified addresses corresponding to the first and second items.

In an even further embodiment, fingerprint program 114 identifies an address for a shipping address for each item in an online shopping cart based on a fingerprint of a user for each respective item in the online shopping cart. For example, a user has a first item, a second item, and a third item in an online shopping cart. The user executes fingerprint program 114 to identify an address for a shipping address for each respective item in the online shopping cart. Fingerprint program 114 receives a first fingerprint, identifies a first stored address based on the first fingerprint, and selects the first stored address as the shipping address for the first item. Fingerprint program 114 receives a second fingerprint, identifies a second stored address based on the second fingerprint, and selects the second stored address as the shipping address for the second item. Fingerprint program 114 receives a third fingerprint, identifies a third stored address based on the third fingerprint, and selects the third stored address as the shipping address for the third item.

In an alternate embodiment, fingerprint program 114 receives a confirmation to use the identified address through a double-tap gesture, wherein the double-tap gesture is a gesture made by a user consisting of tapping twice in succession with a finger of the user on client interface 112. Furthermore, upon receiving the double-tap gesture, fingerprint program 114 utilizes the identified address for both a shipping address and a billing address. For example, fingerprint program 114 identifies the address: "3003 Location Ave., San Jose, Calif. 95128" as a shipping address for the user. Upon identifying the address, fingerprint program 114 generates a window prompt to the user on client interface 112 requesting "Use address '3003 Location Ave., San Jose, Calif. 95128' as the shipping address? Tap screen to confirm, double-tap screen to confirm the address for both the shipping and billing address, or press and hold to cancel". The user double-taps the screen, and fingerprint program 114 receives a double-tap signal from client interface 112, thus confirming to utilize the identified address as the shipping address and the billing address. Fingerprint program 114 then proceeds in filling out an inputtable text field with the identified address.

Responsive to a confirmation from the user, fingerprint program 114 fills out an inputtable text field with the identified stored address. In this embodiment, fingerprint program 114 fills out an inputtable text field by retrieving from database 116 the identified address associated with the collected fingerprint of the user, and entering the retrieved address into an inputtable text field, wherein the inputtable text field is a modifiable text field requesting address information from a user for a shipping and/or a billing address. For example, upon identifying a stored address based on the fingerprint of a user, fingerprint program 114 acquires the identified address and enters the acquired address into an inputtable text field that is requesting for an address for shipping and/or billing.

In a further embodiment, fingerprint program 114 can then complete the purchase in response to filling out the inputtable text field with the identified stored address. In this embodiment, fingerprint program 114 completes the purchase in response to filling out the inputtable text field by submitting a purchase order to vendor server computer 110, wherein the purchase order includes, but is not limited to, a set of products selected by the user for purchasing, a set of financial credentials of the user (e.g., a credit card number or a debit card number, a card verification value (CVV) number, an expiration date), the confirmed address for billing, and the confirmed address for shipping. For example, a user selects a set of products for purchase on a retailer website using client interface 112, and then proceeds to a checkout interactive window displayed on client interface 112. The user provides a set of financial credentials of the user by entering on client interface 112 a credit card number, a CVV number associated with the credit card number, and an expiration date associated with the credit card number. Fingerprint program 114 determines the user initiated a purchase by receiving a confirmation by the user that the financial credentials are correct by selecting a confirmation interactive icon on client interface 112. In response to the confirmation to the financial credentials, fingerprint program 114 requests a live scan of a fingerprint of the user in order to identify an address. Fingerprint program 114 receives a fingerprint signal from fingerprint device 104, identifies a stored address based on the fingerprint, fills out an inputtable text field with the identified address in response to a confirmation from the user to utilize the identified address as a shipping address and/or billing address. Responsive to filling out the inputtable text field with the identified address, fingerprint program 114 submits a purchase order (i.e., the selected set of products chosen by the user, the financial credentials of the user, the confirmed address for shipping, and the confirmed address for billing) to vendor server computer 110 for processing by a vendor associated with the retailer website.

Figure 3:
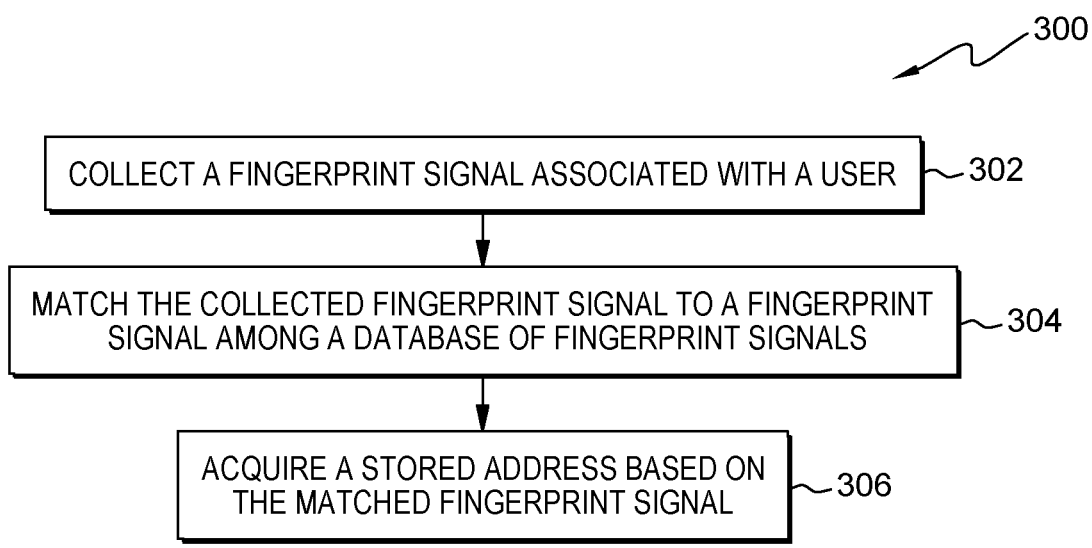
FIG. 3 is a flowchart depicting operational steps of identifying a stored address, in accordance with an embodiment of the present invention.

FIG. 3 is a flowchart 300 depicting operational steps of identifying a stored address associated with a fingerprint of a user, in accordance with an embodiment of the present invention.

In step 302, fingerprint program 114 collects a fingerprint signal associated with a user. In this embodiment, fingerprint program 114 collects a fingerprint signal associated with a finger of a user by transmitting a set of instructions to fingerprint device 104 to detect that a finger of the user is positioned for a fingerprint scan, detecting that the finger of the user is positioned for a fingerprint scan, transmitting a set of instructions to fingerprint device 104 to scan the fingerprint associated with the detected finger to obtain a fingerprint signal, and storing the fingerprint signal on database 116 for matching with a database of fingerprint signals as performed in step 304. As used herein, a fingerprint signal is a digital signal that describes a fingerprint associated with a finger of a user. As used herein, a stored set of fingerprint signals is also commonly referred to as a database of fingerprint signals. For example, fingerprint program 114 instructs fingerprint device 104 to detect that a finger of the user is positioned for a fingerprint scan. The user positions a finger to allow fingerprint device 104 to scan a fingerprint of the finger. Fingerprint program 114 detects that the finger of the user is positioned for a fingerprint scan, and then instructs fingerprint device 104 to scan the fingerprint to obtain a fingerprint signal. Fingerprint program 114 receives the fingerprint signal from fingerprint device 104, and stores the fingerprint signal on database 116 for matching with a database of fingerprint signals as performed in step 304, thus collecting a fingerprint signal associated with the user.

In step 304, fingerprint program 114 matches the collected fingerprint signal to a fingerprint signal among a database of fingerprint signals. In this embodiment, fingerprint program 114 matches the collected fingerprint signal to a fingerprint signal among a database of fingerprint signals by comparing the collected fingerprint signal to each of the fingerprint signals among a database of fingerprint signals stored on database 116, and determining that a fingerprint signal among the database of fingerprint signals is a match based on the collected fingerprint signal. As used herein, a match is when fingerprint program 114 determines that a collected fingerprint signal and a fingerprint signal among the database of fingerprint signals are greater than a threshold value based on a signal similarity calculation, wherein the signal similarity calculation is a measure of signal deviation, ranging from 0% to 100% similarity, between the collected fingerprint signal and the fingerprint signal among the database of fingerprint signals. A threshold value can be 95% similarity, wherein a similarity calculation resulting in a greater or equal value of 95% similarity indicates that the collected fingerprint signal and the fingerprint among the database of fingerprint signals are a match. For example, fingerprint program 114 collects from a user a fingerprint signal. Fingerprint program 114 compares the collected fingerprint signal to each of the fingerprint signals among the database of fingerprint signals, and determines that a fingerprint signal among the database of fingerprint signals is a match based on a similarity calculation of 97% similarity, which exceeds the threshold value of 95% similarity.

In another embodiment, if fingerprint program 114 cannot find a match above a threshold value between a collected fingerprint signal and each of the fingerprint signals among a database of fingerprint signals stored on database 116, then fingerprint program 114 can transmit a set of instructions to client interface 112 that informs the user that a match was not found based on the collected fingerprint signal. Fingerprint program 114 can then transmit a request to the user to store an address to be associated with the collected fingerprint signal. Responsive to receiving a confirmation from the user to store an address to be associated with the collected fingerprint signal, fingerprint program 114 creates a mapping between a fingerprint signal and an address by collecting a fingerprint signal and an address chosen by a user to be associated with the fingerprint signal, and storing the collected fingerprint signal, the collected address to be associated with the collected fingerprint signal, and a fingerprint-address data to database 116 as components of profile data corresponding to the user, wherein the fingerprint-address data describes a mapping between a fingerprint signal and an address of the user for. Upon storing the components of profile data corresponding to the user, fingerprint program 114 proceeds to step 306 in acquiring a stored address based on the associated fingerprint signal.

In step 306, fingerprint program 114 acquires a stored address based on the matched fingerprint signal. In this embodiment, fingerprint program 114 acquires a stored address based on the matched fingerprint signal by acquiring a fingerprint-address data stored on database 116 corresponding to the matched fingerprint signal among the database of fingerprint signals, and selecting a stored address based on the fingerprint-address data. For example, fingerprint program 114 matches a collected fingerprint signal to a fingerprint signal among a database of fingerprint signals. Fingerprint program 114 acquires the fingerprint-address data corresponding to the matched fingerprint signal among the database of fingerprint signals, and selects a stored address associated with the matched fingerprint signal among the database of fingerprint signals, thus acquiring a stored address for filling out an inputtable text field that requests a shipping and/or a billing address.

Figure 4:
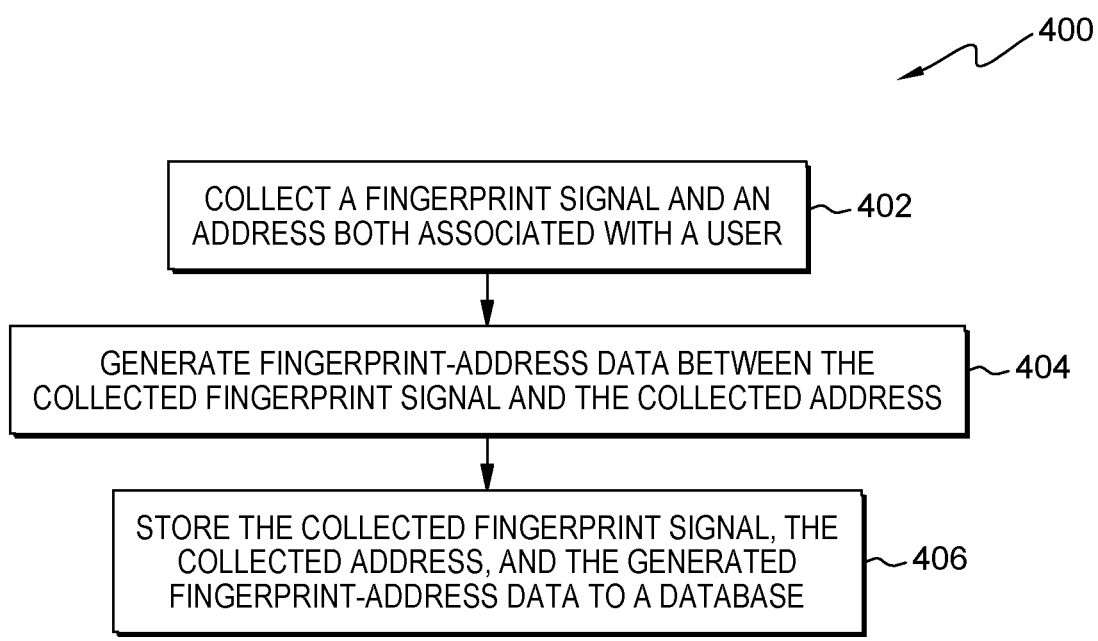
FIG. 4 is a flowchart depicting operational steps of mapping a fingerprint signal of a user to an address of the user, in accordance with an embodiment of the present invention.

FIG. 4 is a flowchart 400 depicting operational steps of mapping a fingerprint signal of a user to an address of the user, in accordance with an embodiment of the present invention.

In step 402, fingerprint program 114 collects a fingerprint signal and an address both associated with a user. In this embodiment, fingerprint program 114 collects a fingerprint signal associated with a finger of a user by transmitting a set of instructions to fingerprint device 104 to detect that a finger of the user is positioned for a fingerprint scan, detecting that the finger of the user is positioned for a fingerprint scan, transmitting a set of instructions to fingerprint device 104 to scan the fingerprint associated with the detected finger to obtain a fingerprint signal used for generating fingerprint-address data as performed in step 404. As used herein, a fingerprint signal is a digital signal that describes a fingerprint associated with a finger of a user. As used herein, a stored set of fingerprint signals is also commonly referred to as a database of fingerprint signals. For example, fingerprint program 114 instructs fingerprint device 104 to detect that a finger of the user is positioned for a fingerprint scan. The user positions a finger to allow fingerprint device 104 to scan a fingerprint of the finger. Fingerprint program 114 detects that the finger of the user is positioned for a fingerprint scan, and then instructs fingerprint device 104 to scan the fingerprint to obtain a fingerprint signal.

Furthermore, fingerprint program 114 collects an address associated with a user by receiving the address from the user via client interface 112. For example, a user types in an inputtable text field on client interface 112 that describes an address location used for shipping and/or billing desired by the user. Fingerprint program 114 collects the inputted address and later uses the collected address and the collected fingerprint signal for generating fingerprint-address data as performed in step 404.

In step 404, fingerprint program 114 generates fingerprint-address data between the collected fingerprint signal and the collected address. In this embodiment, fingerprint program 114 generates fingerprint-address data by creating a datafile that associates the collected fingerprint signal to the collected address. For example, fingerprint program 114 collects from a user a fingerprint signal and an address. Responsive to collecting the fingerprint signal and the address, fingerprint program 114 then generates fingerprint-address data as a datafile that allows fingerprint program 114 to acquire the address based on a collected fingerprint signal.

In step 406, fingerprint program 114 stores the collected fingerprint signal, the collected address, and the generated fingerprint-address data to a database. In this embodiment, fingerprint program 114 stores the collected fingerprint signal, the collected address, and the generated fingerprint-address data (collectively called profile data) by storing the profile data to database 116, which fingerprint program 114 can use in reference for providing an address associated with a fingerprint of a user.

Figure 5A:
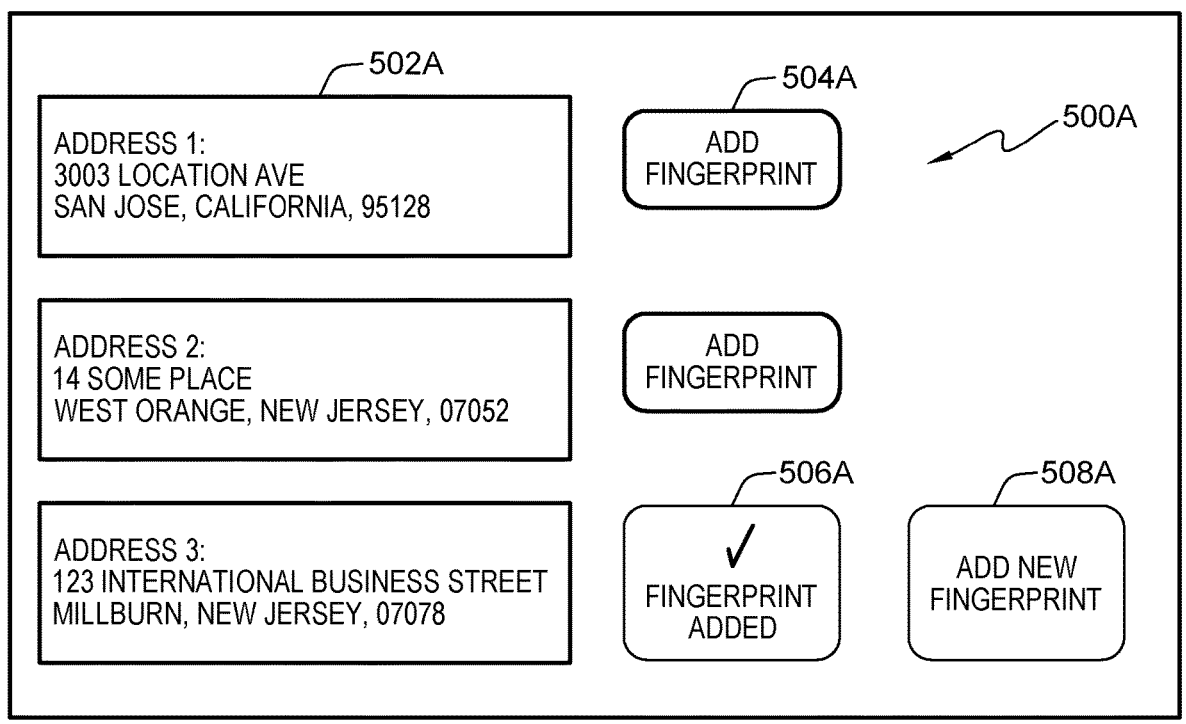
FIG. 5A is a screenshot example of an interactive graphical user interface for a fingerprint program for mapping a fingerprint with an address, in accordance with an embodiment of the present invention.

FIG. 5A is a screenshot example of an interactive graphical user interface 500A for a client interface menu for mapping a fingerprint with an address, in accordance with an embodiment of the present invention.

FIG. 5A demonstrates an example client interface 112 menu that enables a user to map a fingerprint with an address. In general, interactive graphical user interface 500A includes one or more graphical icons, one or more interactive graphical icons, and one or more interactive lists that are viewable to the user, and allow the user to interact with fingerprint program 114 for mapping a fingerprint with an address. For example, interactive graphical user interface 500A can display an interactive list of addresses 502A that a user can add, edit, and store a set of addresses. In this example, interactive list 502A lists a variety of addresses inputted by a user (e.g., "3003 Location Ave, San Jose, Calif., 95128"; "14 Some Place, West Orange, N.J., 07052"; and "123 International Business Street, Millburn, N.J., 07078"). In another example, interactive graphical user interface 500A can display an interactive graphical icon that executes operational steps for mapping a fingerprint signal with an address. In this example, interactive icon 504A instructs fingerprint program 114 to collect a fingerprint signal associated with a fingerprint of the user to be mapped with address "3003 Location Ave, San Jose, Calif., 95128". In another example, interactive graphical user interface 500A can display a graphical icon that informs the user that a fingerprint signal has been collected, stored, and mapped by fingerprint program 114 for an associated address. In this example, fingerprint program 114 has collected, stored, and mapped a first fingerprint signal associated with a first fingerprint of a user for address "123 International Business Street, Millburn, N.J., 07078", and informs the user that the first fingerprint has been collected, stored, and mapped by displaying icon 506A, which states "Fingerprint Added". In another example, interactive graphical user interface 500A can display an interactive icon that allows a user to replace a first fingerprint with a second fingerprint to be mapped with an associated address. In this example, interactive icon 508A instructs fingerprint program 114 to collect a second fingerprint signal associated with a second fingerprint of the user to replace a first fingerprint signal to be mapped with the address "123 International Business Street, Millburn, N.J., 07078".

Figure 5B:
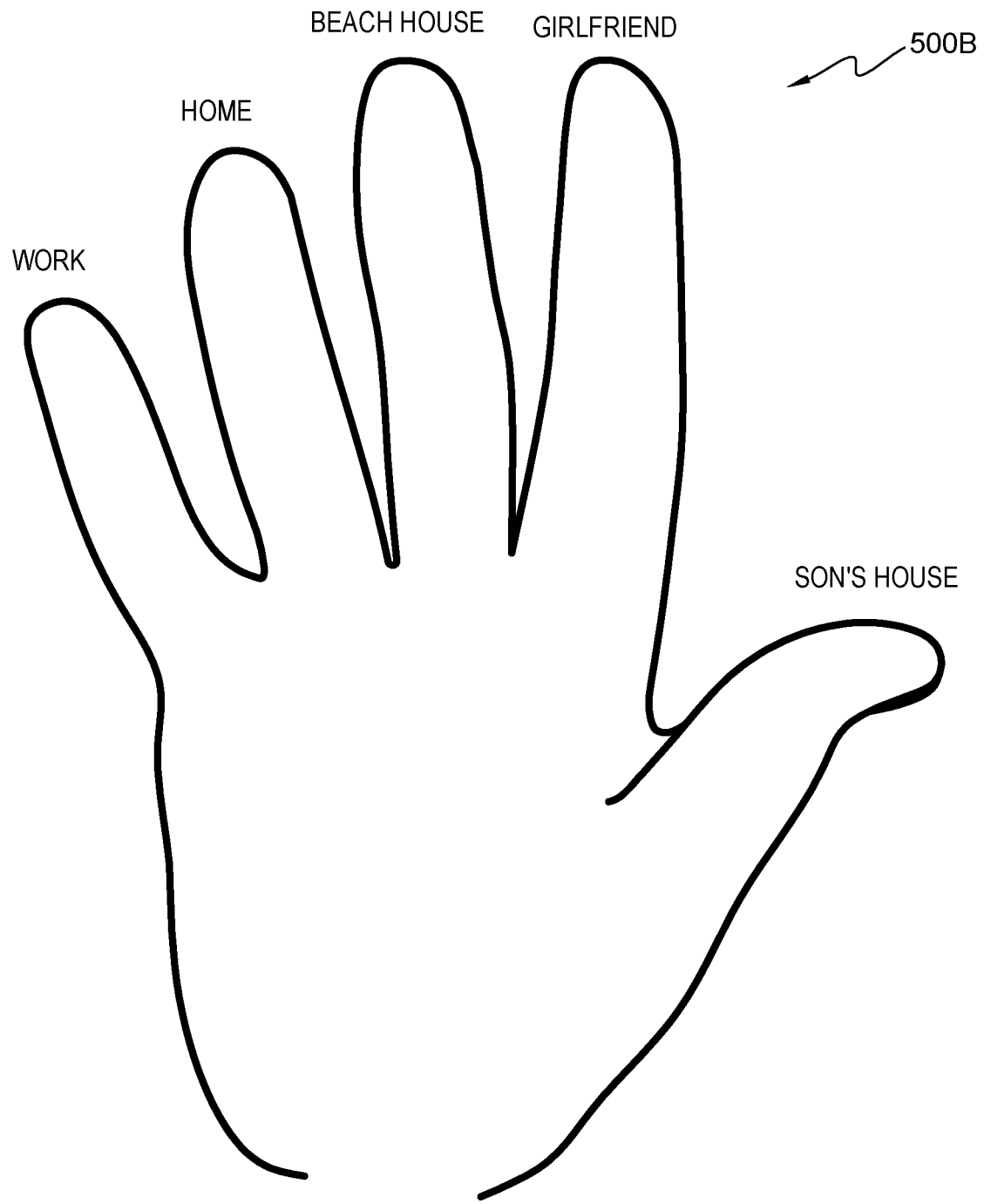
FIG. 5B is an example of a hand of a user demonstrating an association of a set of addresses corresponding to a set of fingerprints of the user, in accordance with an embodiment of the present invention.

FIG. 5B is an example of a hand of a user demonstrating an association of a set of addresses corresponding to a set of fingerprints of the user, in accordance with an embodiment of the present invention.

FIG. 5B demonstrates an embodiment wherein fingerprint program 114 has stored on database 116 a set of fingerprint signals corresponding to a set of fingerprints of a user (i.e., a database of fingerprint signals), a set of addresses, and a set of fingerprint-address data that maps a fingerprint signal among the set of fingerprint signals to an address among the set of addresses. In this example embodiment, fingerprint program 114 has stored on database 116 an address associated with a home location of a son of the user, a fingerprint signal associated with the fingerprint of a first digit (i.e., thumb) of the user, and fingerprint-address data that maps the address associated with the home location of the son of the user to the fingerprint signal associated with the fingerprint of the first digit of the user. In other words, when fingerprint program 114 collects the fingerprint signal associated with the first digit of the user from fingerprint device 104 and matches the fingerprint signal to the database of fingerprint signals, then fingerprint program 114 can acquire the address associated with the home location of the son of the user based on the fingerprint-address data, which fingerprint program 114 can then input the acquired address into an inputtable text field requesting an address for shipping or billing.

In continuing the example embodiment, fingerprint program 114 also has stored on database 116 a set of addresses corresponding to a home of a girlfriend of the user, a home of a beach house of the user, a home of the user, and a work location of the user. Fingerprint program 114 also has stored on database 116 a set of fingerprint signals corresponding to a fingerprint corresponding to a second, third, fourth, and fifth digit of the user. Furthermore, fingerprint program 114 has stored on database 116 fingerprint-address data that maps the address of the girlfriend of the user to the fingerprint signal of the second digit of the user, the address of the beach house of the user to the fingerprint signal of the third digit of the user, the address of the home of the user to the fingerprint signal of the fourth digit of the user, and the address of the work location of the user to the fingerprint signal of the fifth digit of the user. In this example embodiment, fingerprint program 114 can collect the fingerprint signal corresponding to the second digit of the user, and then acquire the address of the girlfriend of the user based on the collected fingerprint signal of the second digit of the user and the corresponding fingerprint-address data. Likewise, fingerprint program 114 can collect the fingerprint signal corresponding to the third digit of the user, and then acquire the address of the beach house of the user based on the collected fingerprint signal of the third digit of the user and the corresponding fingerprint-address data; fingerprint program 114 can collect the fingerprint signal corresponding to the fourth digit of the user, and then acquire the address of the home of the user based on the collected fingerprint signal of the fourth digit of the user and the corresponding fingerprint-address data; and fingerprint program 114 can collect the fingerprint signal corresponding to the fifth digit of the user, and then acquire the address of the work location of the user based on the collected fingerprint signal of the fifth digit of the user and the corresponding fingerprint-address data.

Figure 5C:
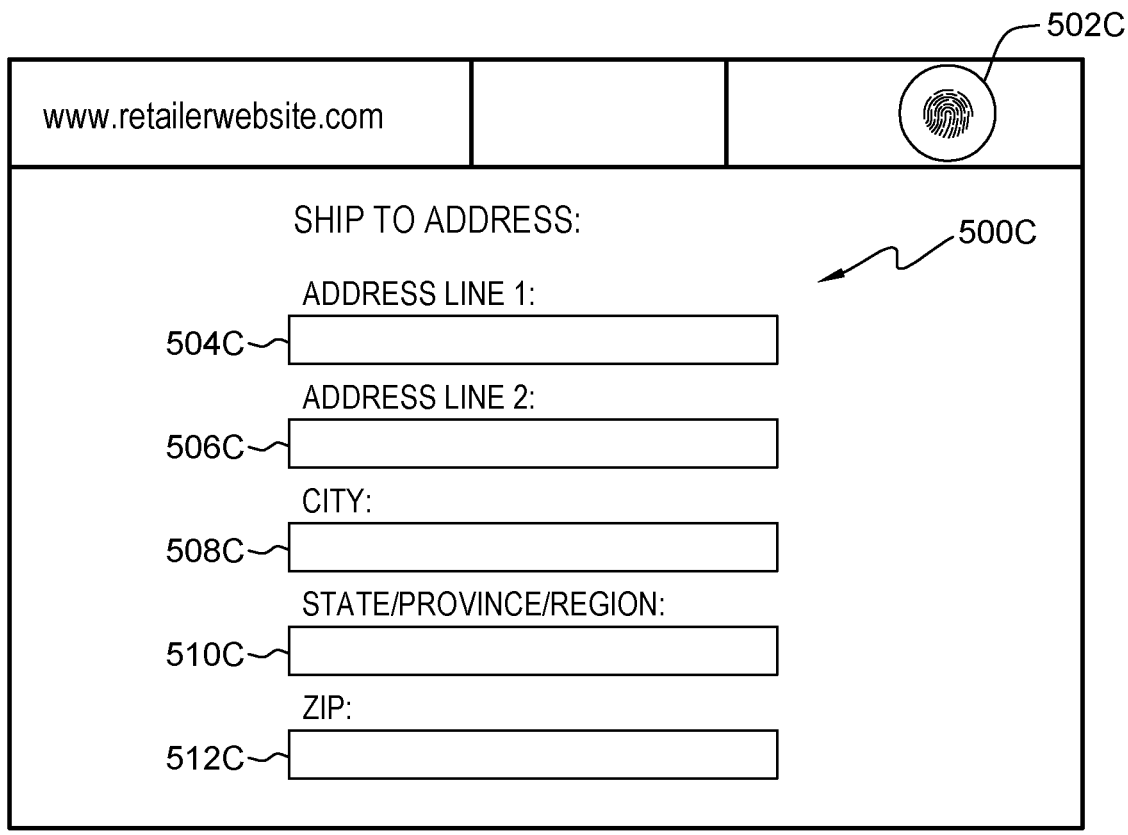
FIG. 5C is a screenshot example of an interactive graphical user interface of a retailer website requesting a shipping address for a purchase, in accordance with an embodiment of the present invention.

FIG. 5C is a screenshot example of an interactive graphical user interface 500C of a retailer website requesting a shipping address for a purchase, in accordance with an embodiment of the present invention.

FIG. 5C demonstrates an example internet browser, designated as interactive graphical user interface 500C, accessing a retailer website that is requesting a shipping address for a purchase order prior to the execution of fingerprint program 114. In general, interactive graphical user interface 500C includes one or more inputtable text fields, and one or more interactive graphical icons. For example, interactive graphical user interface 500C can display an interactive icon that allows a user to prompt fingerprint program 114 to execute step 202 in requesting a live scan of a fingerprint of the user for identifying an address based on the fingerprint. In this example, interactive icon 502C is symbolized as a fingerprint icon. In another example, interactive graphical user interface 500C can display a set of inputtable text fields (i.e., inputtable text field 504C, 506C, 508C, 510C, and 512C) for inputting a shipping address for a purchase order. In this example, inputtable text field 504C requests the "Address Line 1" of a shipping address of a user, inputtable text field 506C requests the "Address Line 2" of a shipping address of user, inputtable text field 508C requests the "City" of a shipping address of user, inputtable text field 510C requests the "State/Province/Region" of a shipping address of user, and inputtable text field 512C requests the "ZIP" of a shipping address of user.

Figure 5D:
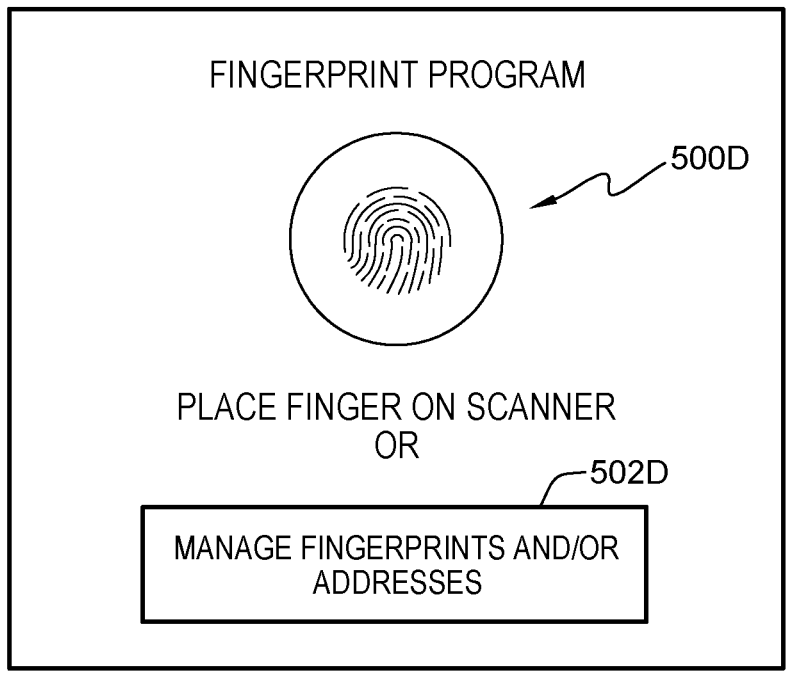
FIG. 5D is a screenshot example of a fingerprint program requesting a live scan of a fingerprint of a user, in accordance with an embodiment of the present invention.

FIG. 5D is a screenshot example of an interactive fingerprint program notification window 500D requesting a live scan of a fingerprint of a user, in accordance with an embodiment of the present invention.

FIG. 5D demonstrates an example interactive graphical user interface 500D for notifying a user to place a finger on fingerprint device 104 for a live scan of a fingerprint of the user. In general, interactive graphical interface 500D includes one or more interactive graphical icons. In continuing the example demonstrated in FIG. 5C, a user executes fingerprint program 114 by selecting interactive icon 502C. Responsive to the user selection, fingerprint program 114 displays interactive graphical user interface 500D on client interface 112 that requests the user to place a finger for a live scan. In another example, interactive graphical user interface 500D can display an interactive icon that allows the user to add, edit, or manage a set of fingerprints and a corresponding set of addresses stored on database 116 as is demonstrated in FIG. 5A. In this example, interactive icon 502D prompts fingerprint program 114 to display interactive graphical user interface 500A, allowing a user to add, edit, or manage a set of fingerprints and a corresponding set of addresses.

Figure 5E:
FIG. 5E is a screenshot example of an interactive graphical user interface of a retailer website with populated text fields for providing a shipping address, in accordance with an embodiment of the present invention.

FIG. 5E is a screenshot example of an interactive graphical user interface 500E of a retailer website with populated text fields for providing a shipping address, in accordance with an embodiment of the present invention.

FIG. 5E demonstrates an example internet browser, designated as interactive graphical user interface 500E, of a retailer website that is requesting a shipping address for a purchase with inputtable text fields populated by fingerprint program 114. In general, interactive graphical user interface 500E includes one or more inputtable text fields populated with an address, and one or more interactive graphical icons. In continuing the example of FIG. 5D, a user places a finger on fingerprint device 104, and in response, fingerprint program 114 collects a fingerprint signal associated with the finger of the user, identifies stored address "3003 Location Ave, San Jose, Calif., 95128" based on the fingerprint, and populates an inputtable text field with the identified stored address. In this example, fingerprint program 114 populates inputtable text field 504E with the text string "3003 Location Ave", populates inputtable text field 508E with the text string "San Jose", populates inputtable text field 510E with the text string "California", and populates inputtable text field 512E with the text string "95128". In another example, interactive graphical user interface 500E can display an interactive graphical icon that allows a user to re-execute fingerprint program 114 to request a new live scan of a different fingerprint of the user to obtain a different a address (e.g., the user realizes the user scanned the wrong finger which acquired an undesired address. The user can execute fingerprint program 114 again to scan a correct finger to acquire a desired address). In this example, interactive icon 502E is symbolized as a fingerprint icon.

Figure 5F:
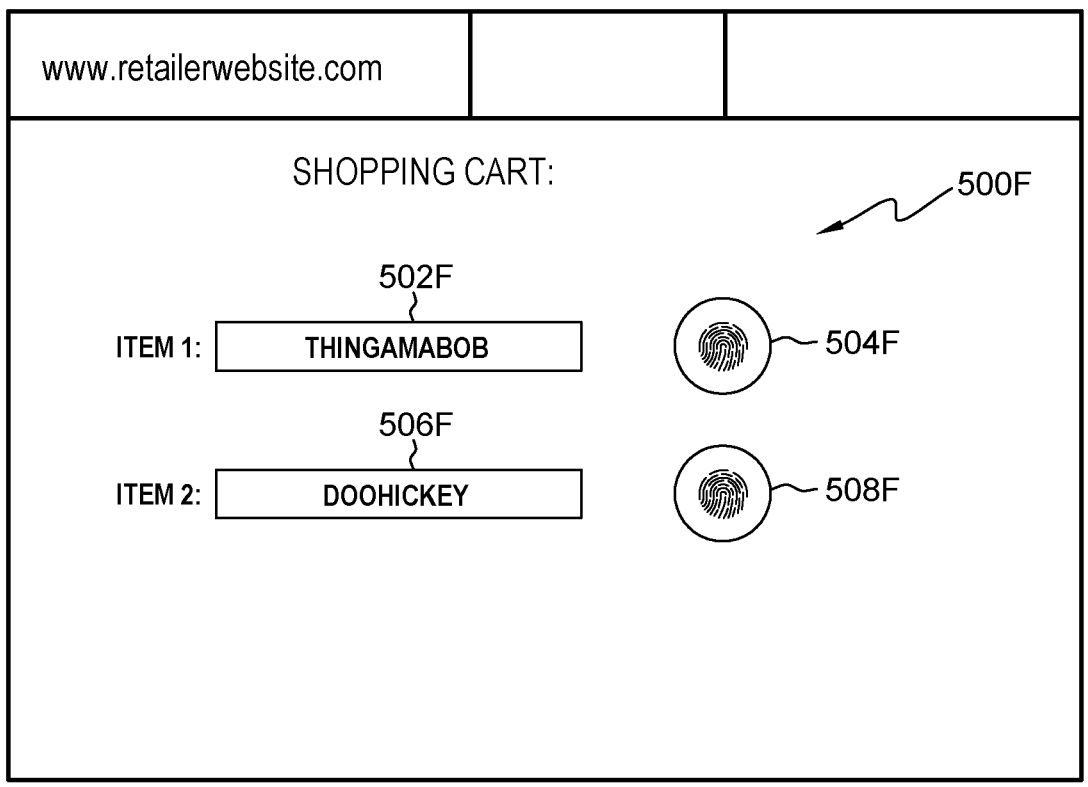
FIG. 5F is a screenshot example of an interactive graphical user interface of a populated online shopping cart paired with interactive graphical icons of a fingerprint program for providing a shipping address for each item, in accordance with an embodiment of the present invention.

FIG. 5F is a screenshot example of an interactive graphical user interface 500F of a populated online shopping cart paired with interactive graphical icons of a fingerprint program for providing a shipping address for each item, in accordance with an embodiment of the present invention.

FIG. 5F demonstrates an example online shopping cart, designated as interactive graphical user interface 500F, populated with items selected by a user. In general, interactive graphical user interface 500F includes one or more text fields, and one or more interactive graphical icons. For example, interactive graphical user interface 500F can display a list of one or more text fields that correspond respectively to one or more items added to an online shopping cart by a user. In this example, text field 502F describes a first item, called "Thingamabob", that a user added to an online shopping cart associated with the user; and text field 506F describes a second item, called "Doohickey", that a user added to an online shopping cart associated with the user. In another example, interactive graphical user interface 500F can display one or more interactive graphical icons that correspond respectively to the one or more items added to the online shopping cart by the user that, when selected by the user, prompts fingerprint program 114 to execute step 202 in requesting a live scan of a fingerprint of the user for providing a shipping address for the respective item. In this example, interactive icon 504F corresponds to text field 502F of an item called "Thingamabob", and is symbolized as a fingerprint icon. Likewise, interactive icon 508F corresponds to text field 506F of an item called "Doohickey", and is symbolized as a fingerprint icon.

Figure 6:
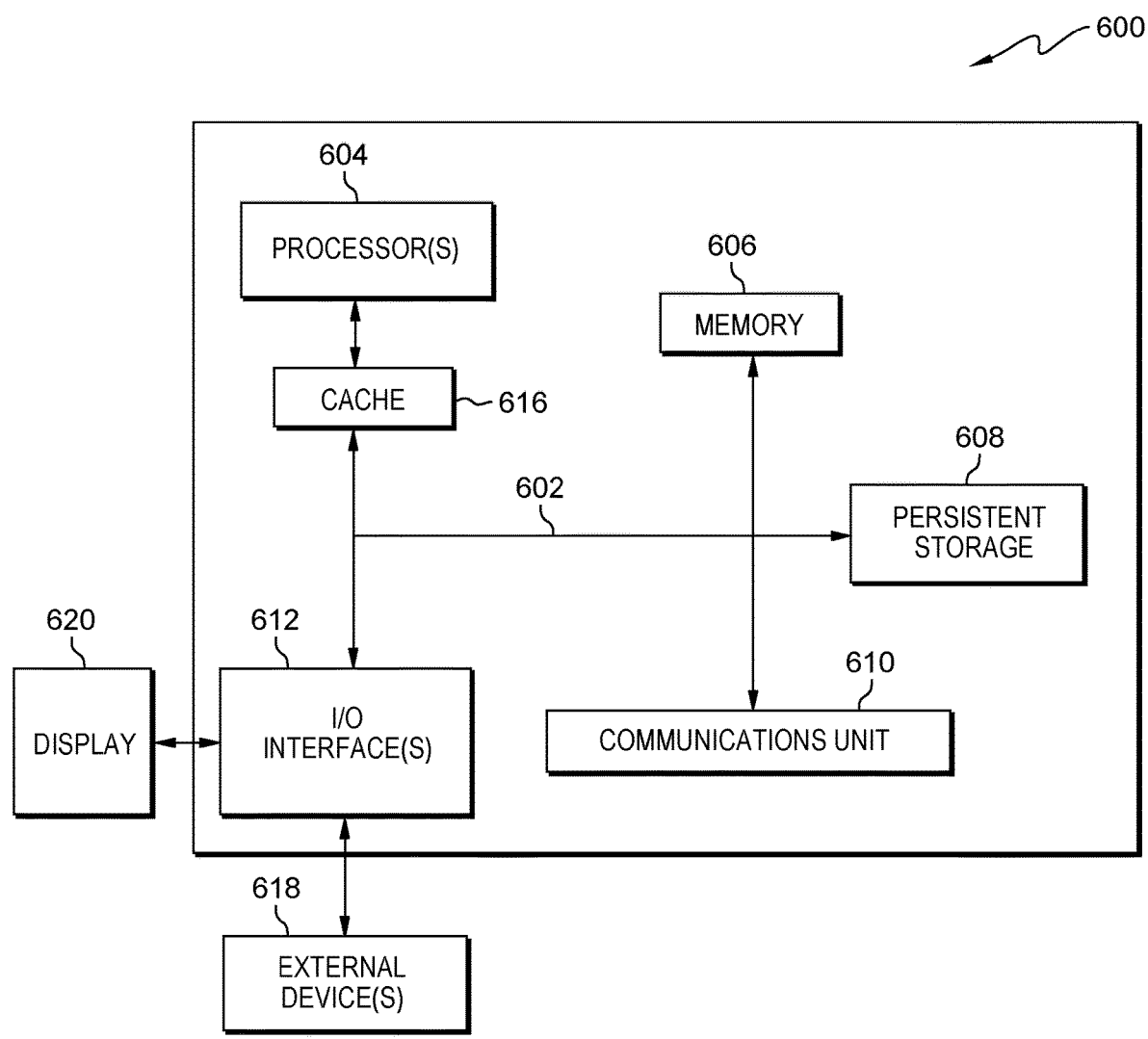
FIG. 6 depicts a block diagram of components of the computing systems of FIG. 1, in accordance with an embodiment of the present invention.

FIG. 6 depicts a block diagram of components of computing systems within fingerprint collection environment 100 of FIG. 1, in accordance with an embodiment of the present invention. It should be appreciated that FIG. 6 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Computer system 600 includes communications fabric 602, which provides communications between cache 616, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses or a crossbar switch.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of computer processor(s) 604 by holding recently accessed data, and data near accessed data, from memory 606.

Fingerprint program 114 may be stored in persistent storage 608 and in memory 606 for execution by one or more of the respective computer processors 604 via cache 616. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Fingerprint program 114 may be downloaded to persistent storage 608 through communications unit 610.

I/O interface(s) 612 allows for input and output of data with other devices that may be connected to client computer 102. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention, e.g., Fingerprint program 114, can be stored on such portable computer readable storage media and can be loaded onto persistent storage 608 via I/O interface(s) 612. I/O interface(s) 612 also connect to a display 620.

Display 620 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
responsive to a determination that a user initiated a single multi-item purchase transaction for a plurality of items gathered in an online shopping cart, requesting a live scan of a first fingerprint and a second fingerprint;
identifying a first stored address based on said first fingerprint and a second address based on said second fingerprint; and
responsive to a confirmation from the user, filling out a first inputtable text field with said first identified stored address and a second inputtable text field with said second identified stored address, wherein said first identified stored address is a shipping address for a first item in said plurality of items and said second identified stored address is a shipping address for a second item in said plurality of items.

2. The computer-implemented method of claim 1, wherein identifying said first and second stored addresses based on said first fingerprint and said second fingerprint comprises:
collecting a first fingerprint signal associated with said first fingerprint and a second fingerprint signal associated with said second fingerprint;
matching the collected first fingerprint signal and the collected second fingerprint signal to a first fingerprint signal and a second fingerprint signal of a plurality of fingerprint signals stored in a database; and
acquiring a first stored address associated with the matched first fingerprint signal and a second stored address associated with the matched second fingerprint signal.

3. The computer-implemented method of claim 1, further comprising:
building a database of fingerprint signals having associated metadata, wherein building the database comprises:
collecting a fingerprint signal associated with a fingerprint;
generating fingerprint-address data between the collected fingerprint signal and an address by associating the collected fingerprint signal with an address associated with the user; and
storing the collected fingerprint signal and the generated fingerprint-address data to the database.

4. The computer-implemented method of claim 1, wherein a confirmation from the user comprises:
receiving a double-tap gesture from a user on a user interface, wherein the double-tap gesture is a gesture where the user taps twice in succession on the user interface.

5. The computer-implemented method of claim 1, further comprising:
generating an interactive user display for a display screen of an electronic device that allows for fingerprint registration,
wherein the electronic device has a touch sensitive interface capable of receiving a fingerprint and associated fingerprint signal of the fingerprint, and
wherein the generated interactive user display comprises:
one or more interactive lists that allow a user to add, edit, and store a set of addresses,
one or more interactive graphical icons that execute operational steps for mapping a fingerprint signal with an address among the stored set of addresses,
one or more graphical icons that, when selected, informs the user that a fingerprint signal is collected, stored, and mapped with an address among the stored set of addresses, and
one or more interactive graphical icons that, when selected, executes operational steps for mapping a second fingerprint signal with an address among the stored set of addresses, wherein the second fingerprint signal replaces a first fingerprint signal associated with the address among the stored set of addresses.

6. The computer-implemented method of claim 1, wherein requesting a live scan of a fingerprint is performed on an electronic device comprising an input mechanism for fingerprint collection and a user display.

7. A computer program product comprising:
one or more computer readable storage media and program instructions stored on the one or more computer readable storage media, the program instructions comprising:
responsive to a determination that a user initiated a single multi-item purchase transaction for a plurality of items gathered in an online shopping cart, program instructions to request a live scan of a first fingerprint and a second fingerprint;
program instructions to identify a first stored address based on said first fingerprint and a second address based on said second fingerprint; and
responsive to a confirmation from the user, program instructions to fill out a first inputtable text field with said first identified stored address and a second inputtable text field with said second identified stored address, wherein said first identified stored address is a shipping address for a first item in said multi-item purchase and said second identified stored address is a shipping address for a second item in said plurality of items.

8. The computer program product of claim 7, wherein the program instructions to identify said first and second stored addresses based on said first fingerprint and said second fingerprint comprise:
program instructions to collect first fingerprint signal associated with said first fingerprint and a second fingerprint signal associated with said second fingerprint;
program instructions to match the collected first fingerprint signal and the collected second fingerprint signal to a first fingerprint signal and a second fingerprint signal of a plurality of fingerprint signals stored in a database; and
program instructions to acquire a first stored address associated with the matched first fingerprint signal and a second stored address associated with said matched second fingerprint signal.

9. The computer program product of claim 7, wherein the program instructions stored on the one or more computer readable storage media further comprise:
program instructions to build a database of fingerprint signals having associated metadata, wherein the program instructions to build the database comprise:
program instructions to collect a fingerprint signal associated with a fingerprint;
program instructions to generate fingerprint-address data between the collected fingerprint signal and an address by associating the collected fingerprint signal with an address associated with the user; and program instructions to store the collected fingerprint signal and the generated fingerprint-address data to the database.

10. The computer program product of claim 7, wherein a confirmation from the user comprises:

program instructions to receive a double-tap gesture from a user on a user interface, wherein the double-tap gesture is a gesture where the user taps twice in succession on the user interface.

11. The computer program product of claim 7, wherein the program instructions stored on the one or more computer readable storage media further comprise:

program instructions to generate an interactive user display for a display screen of an electronic device that allows for fingerprint registration, wherein the electronic device has a touch sensitive interface capable of receiving a fingerprint and associated fingerprint signal of the fingerprint, and wherein the generated interactive user display comprises:
one or more interactive lists that allow a user to add, edit, and store a set of addresses,
one or more interactive graphical icons that execute operational steps for mapping a fingerprint signal with an address among the stored set of addresses,
one or more graphical icons that, when selected, informs the user that a fingerprint signal is collected, stored, and mapped with an address among the stored set of addresses, and
one or more interactive graphical icons that, when selected, executes operational steps for mapping a second fingerprint signal with an address among the stored set of addresses, wherein the second fingerprint signal replaces a first fingerprint signal associated with the address among the stored set of addresses.

12. The computer program product of claim 7, wherein the program instructions to request a live scan of a fingerprint is performed on an electronic device comprising an input mechanism for fingerprint collection and a user display.

13. A computer system comprising:
one or more computer processors;
one or more computer readable storage media; and
program instructions stored on the one or more computer readable storage media for execution by at least one of the one or more processors, the program instructions comprising:
responsive to a determination that a user initiated a single multi-item purchase transaction for a plurality of items gathered in an online shopping cart, program instructions to request a live scan of a first fingerprint and a second fingerprint;
program instructions to identify a first stored address based on said first fingerprint and a second address based on said second fingerprint; and
responsive to a confirmation from the user, program instructions to fill out a first inputtable text field with said first identified stored address and a second inputtable text field with said second identified stored address, wherein said first identified stored address is a shipping address for a first item in said plurality of items and said second identified stored address is a shipping address for a second item in said plurality of items.

14. The computer system of claim 13, wherein the program instructions to identify said first and second stored addresses based on said first fingerprint and said second fingerprint comprise:

program instructions to collect a first fingerprint signal associated with said first fingerprint and a second fingerprint signal associated with said second fingerprint;
program instructions to match the collected first fingerprint signal and the collected second fingerprint signal to a first fingerprint signal and a second fingerprint signal of a plurality of fingerprint signals stored in a database; and
program instructions to acquire a first stored address associated with the matched first fingerprint signal and a second stored address associated with the matched second fingerprint signal.

15. The computer system of claim 13, wherein the program instructions stored on the one or more computer readable storage media further comprise:

program instructions to build a database of fingerprint signals having associated metadata, wherein the program instructions to build the database comprise:
program instructions to collect a fingerprint signal associated with a fingerprint;
program instructions to generate fingerprint-address data between the collected fingerprint signal and an address by associating the collected fingerprint signal with an address associated with the user; and
program instructions to store the collected fingerprint signal and the generated fingerprint-address data to the database.

16. The computer system of claim 13, wherein a confirmation from the user comprises:

program instructions to receive a double-tap gesture from a user on a user interface, wherein the double-tap gesture is a gesture where the user taps twice in succession on the user interface.

17. The computer system of claim 13, wherein the program instructions stored on the one or more computer readable storage media further comprise:

program instructions to generate an interactive user display for a display screen of an electronic device that allows for fingerprint registration, wherein the electronic device has a touch sensitive interface capable of receiving a fingerprint and associated fingerprint signal of the fingerprint, and wherein the generated interactive user display comprises:
one or more interactive lists that allow a user to add, edit, and store a set of addresses,
one or more interactive graphical icons that execute operational steps for mapping a fingerprint signal with an address among the stored set of addresses,
one or more graphical icons that, when selected, informs the user that a fingerprint signal is collected, stored, and mapped with an address among the stored set of addresses, and
one or more interactive graphical icons that, when selected, executes operational steps for mapping a second fingerprint signal with an address among the stored set of addresses, wherein the second fingerprint signal replaces a first fingerprint signal associated with the address among the stored set of addresses.

* * * * *